United States Patent
Watarai

(10) Patent No.: US 8,335,391 B2
(45) Date of Patent: Dec. 18, 2012

(54) IMAGE PROCESSING APPARATUS AND METHOD FOR TARGET PIXEL NOISE REDUCTION

(75) Inventor: Yuji Watarai, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1408 days.

(21) Appl. No.: 11/936,912

(22) Filed: Nov. 8, 2007

(65) Prior Publication Data

US 2008/0144960 A1 Jun. 19, 2008

(30) Foreign Application Priority Data

Nov. 15, 2006 (JP) ................................. 2006-308997

(51) Int. Cl.
*G06K 9/38* (2006.01)
*G06K 9/40* (2006.01)
(52) U.S. Cl. ....................................... 382/260; 382/270
(58) Field of Classification Search ................. 382/260, 382/270
See application file for complete search history.

(56) References Cited

U.S. PATENT DOCUMENTS

| | | | | |
|---|---|---|---|---|
| 5,467,380 | A * | 11/1995 | De Jonge et al. | 378/98.2 |
| 5,923,775 | A * | 7/1999 | Snyder et al. | 382/172 |
| 6,069,982 | A * | 5/2000 | Reuman | 382/275 |
| 6,681,054 | B1 * | 1/2004 | Gindele | 382/272 |
| 6,718,068 | B1 | 4/2004 | Gindele et al. | |
| 7,065,255 | B2 * | 6/2006 | Chen et al. | 382/260 |
| 7,369,181 | B2 | 5/2008 | Kange et al. | |
| 2006/0204126 | A1 | 9/2006 | Kanda | |

FOREIGN PATENT DOCUMENTS

| | | |
|---|---|---|
| EP | 1 387 317 A1 | 2/2004 |
| JP | 2003-008935 A | 1/2003 |
| JP | 2003-259126 A | 9/2003 |
| JP | 2004-159176 A | 6/2004 |
| JP | 2005-176388 A | 6/2005 |
| JP | 2007-274532 A | 10/2007 |
| KR | 10-2005-0057829 A | 6/2005 |
| WO | WO 97/01153 A1 | 1/1997 |

OTHER PUBLICATIONS

Jong-Sen Lee et al.; "Digital Image Smoothing and the Sigma Filter; Computer Vision, Graphics, and Image Processing", Jan. 7, 1982, Sep. 24, 1982; pp. 255-269, vol. 24, Academic Press, Inc.

(Continued)

*Primary Examiner* — Matthew Bella
*Assistant Examiner* — Patrick Edwards
(74) *Attorney, Agent, or Firm* — Arent Fox LLP

(57) ABSTRACT

There is provided an image processing apparatus and an image processing method capable of exerting a noise reduction effect corresponding to a pixel value of a target pixel. An image processing apparatus that reduces a noise included in a target pixel while reflecting a surrounding pixel located on a surrounding of the target pixel, comprises a selecting section that selects a pixel width tolerable with reference to a true value of the target pixel as a pixel value of the target pixel and correcting section that extracts either one or both pixel values, namely, a pixel value of the surrounding pixel and the pixel value of the target pixel, as a correction value for correcting the pixel value of the target pixel depending on the pixel width selected by the selecting portion.

14 Claims, 9 Drawing Sheets

GRAPH SHOWING CHANGE OF APPROXIMATE VALUE OF NOISE JUDGMENT VALUE
WITH REFERENCE TO PIXEL VALUE OF TARGET PIXEL

OTHER PUBLICATIONS

Rafael C. Gonzalez et al.; "Digital Image Processing"; Prentice Hall, Jan. 9, 1997; pp. 119-124, Upper Saddle River, New Jersey.

Vladimir V. Lukin et al.; "Modified Sigma Filter for Processing Images Corrupted by Multiplicative and Impulsive Noise", Proceedings of EUSIPC096, [Online]; 1996, vol. 3, pp. 1909-1912.

"Image Processing Appliced Technology" by Hiroshi Tanaka, issued by Kogyo Chosaka Publishing, Inc. Jun. 20, 1991 ($3^{rd}$ edition).

"Easily Understandable Digital Image Technology" by Hitoshi Kiya, issued by CQ Publishing Col, Ltd. Feb. 20, 1996 ($1^{st}$ edition).

"ε-Separating Nonlinear Digital Filter and Its Applications" by Hiroshi Harashima et al. Shingakuron, vol. J65-a, No. 4 1982.

* cited by examiner

FIG. 1 SCHEMATIC DIAGRAM OF IMAGE PROCESSING APPARATUS DIRECTED TO FIRST EMBODIMENT

SCHEMATIC DIAGRAM FOR ILLUSTRATING EXTRACTED REGION IN DIGITAL IMAGE USED IN FIRST EMBODIMENT

| | X → | | | | |
|---|---|---|---|---|---|
| Y ↓ | P00 | P10 | P20 | P30 | P40 |
| | P01 | P11 | P21 | P31 | P41 |
| | P02 | P12 | P22 (P22') | P32 | P42 |
| | P03 | P13 | P23 | P33 | P43 |
| | P04 | P14 | P24 | P34 | P44 |

GRAPH SHOWING NOISE JUDGMENT VALUE WITH REFERENCE TO PIXEL VALUE OF TARGET PIXEL

SCHEMATIC DIAGRAM FOR ILLUSTRATING FILTER TABLE USED IN FIRST EMBODIMENT

FIG. 5  SCHEMATIC DIAGRAM OF IMAGE PROCESSING APPARATUS DIRECTED TO SECOND EMBODIMENT

SCHEMATIC DIAGRAM FOR ILLUSTRATING EXTRACTED REGION IN DIGITAL IMAGE USED IN SECOND EMBODIMENT

FIG. 7 SCHEMATIC DIAGRAM OF IMAGE PROCESSING APPARATUS DIRECTED TO THIRD EMBODIMENT

FIG. 8  SCHEMATIC DIAGRAM OF IMAGE PROCESSING APPARATUS DIRECTED TO FOURTH EMBODIMENT

GRAPH SHOWING CHANGE OF APPROXIMATE VALUE OF NOISE JUDGMENT VALUE WITH REFERENCE TO PIXEL VALUE OF TARGET PIXEL

DISTRIBUTION CURVE OF NOISE EXISTENCE PROBABILITY WITH REFERENCE TO PIXEL VALUE OF TARGET PIXEL

GRAPH SHOWING CHANGE OF STANDARD DEVIATION OF NOISE WITH REFERENCE TO PIXEL VALUE OF TARGET PIXEL

IMAGE PROCESSING APPARATUS AND METHOD FOR TARGET PIXEL NOISE REDUCTION

CROSS-REFERENCE TO RELATED APPLICATIONS

This application is based upon and claims the benefit of priority from the prior Japanese Patent Application No. 2006-308997 filed on Nov. 15, 2006, the entire contents of which are incorporated herein by reference.

BACKGROUND

1. Field

The field relates to an image processing apparatus and an image processing method.

2. Description of the Related Art

A digital camera converts an image photographed by an image pickup device to a digital image. In digital cameras in recent years, the photodetection capacity of its image pickup device has been improved so that random noise as well as light from a photographic object is easier to detect thereby reducing S/N ratio. For the reason, the digital cameras in recent years have been demanded to improve the S/N ratio by reducing the random noise and the like while keeping the quality of a photographed image from dropping.

Generally, as an image processing apparatus for improving the S/N ratio by reducing the random noise and the like, apparatuses using a spatial filter provided with a weight table or a median filter have been known. As disclosed in for example, "Image Processing Applied Technology" (written by HIROSHI TANAKA, issued by Kogyo Chosakai Publishing, Inc., June 1991, 3rd edition), the aforementioned spatial filter carries out product sum operation of 3×3 region pixel value within digital image and 3×3 region weight table in succession over entire area of digital image so as to calculate an average of each product sum operation successively. Then, in the aforementioned spatial filter, with each calculated average employed as a pixel value of a target pixel in 3×3 region, the digital image is corrected according to each average calculated over the entire area of the digital image. Then, because the digital image is corrected according to each average in the aforementioned spatial filter, random noise mixed in digital image before correction is smoothed. Thus, random noise mixed in the digital image before correction is reduced in the aforementioned spatial filter so as to improve the S/N ratio.

As disclosed in, for example, "Easily Understandable Digital Image Technology" (written by HITOSHI KIYA, first edition, issued by CQ Publishing Co., Ltd., February 1996), in the aforementioned median filter, all pixel values in the 3×3 region within the digital image are rearranged in descending order so as to obtain a median value (intermediate value) within the rearranged value as a pixel value of the target pixel in the 3×3 region. Then, in this median filter, the median value is obtained over the entire area of the digital image and the digital image is corrected with each median value. Then, because the digital image is corrected by each median value in this median filter, noise mixed in the digital image is suppressed as compared with a case where the digital image is formed with a maximum value of the rearranged values. Thus, this median filter can improve the S/N ratio by correcting the digital image with the median value.

Further, as an image processing apparatus for improving the S/N ratio, a type using $\epsilon$ filter has been known (see "$\epsilon$-separation nonlinear digital filter and its application", by HIROSHI HARASHIMA and other three persons, 1982, SHINGAKURON, vol. J65-A, no. 4). The $\epsilon$ filter has a characteristic of removing small amplitude random noise added to a signal while maintaining an accidental large-amplitude change component in the signal. Then, the $\epsilon$ filter can remove the random noise added to an optical signal from an object so as to improve the S/N ratio.

SUMMARY

It is an aspect of the embodiments discussed herein to provide an image processing apparatus that reduces a noise included in a target pixel while reflecting a surrounding pixel located on a surrounding of the target pixel, the image processing apparatus comprising: a selecting section selecting a pixel width tolerable with reference to a true value of the target pixel as a pixel value of the target pixel; and a correcting section extracting either one or both pixel values, a pixel value of the surrounding pixel and a pixel value of the target pixel, as a correction value for correcting the pixel value of the target pixel depending on the pixel width selected by the selecting section.

The above and further objects and novel features of the embodiment will more fully appear from the following detailed description when the same is read in connection with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

In the image processing apparatus using the above-described spatial filter of the related art, when calculating the pixel value of the target pixel, an average of the product sum operations might be calculated by use of a pixel value in which excessive noise is mixed. Further, in the image processing apparatus using the above-described median filter, when obtaining a pixel value of the target pixel, the median value might be obtained by use of a pixel value in which excessive noise is mixed. In such a case, the pixel value of the target pixel is blocked from approaching the real value of the target pixel by receiving an influence of the pixel value in which excessive noise is mixed. Thus, in the above-described image processing apparatus, the noise reduction effect is not sufficient, so that digital image might be unclear.

Figure 10:
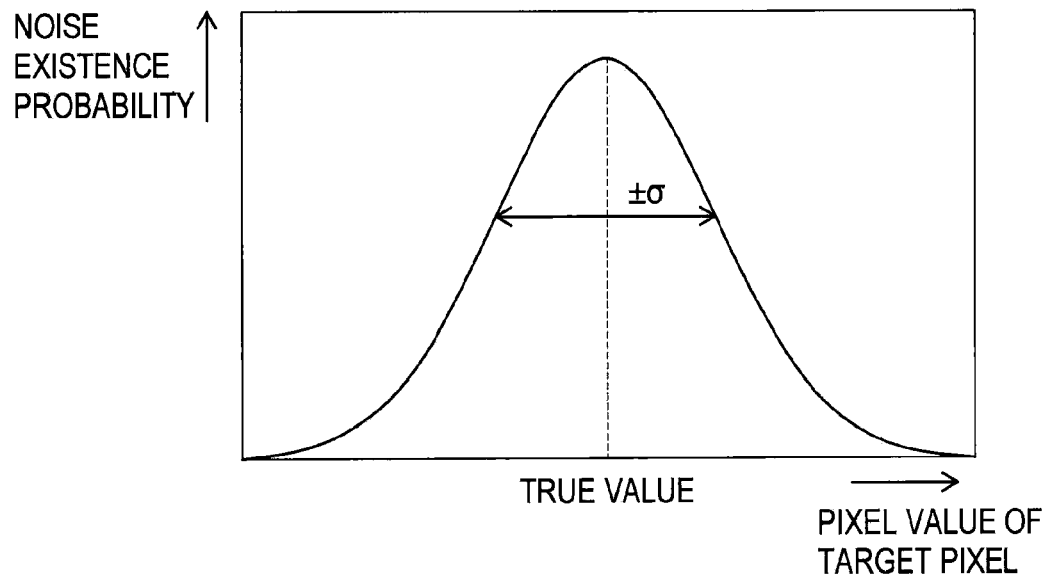
FIG. 10 is a distribution curve of noise existence probability with reference to a pixel value of a target pixel.
Figure 11:
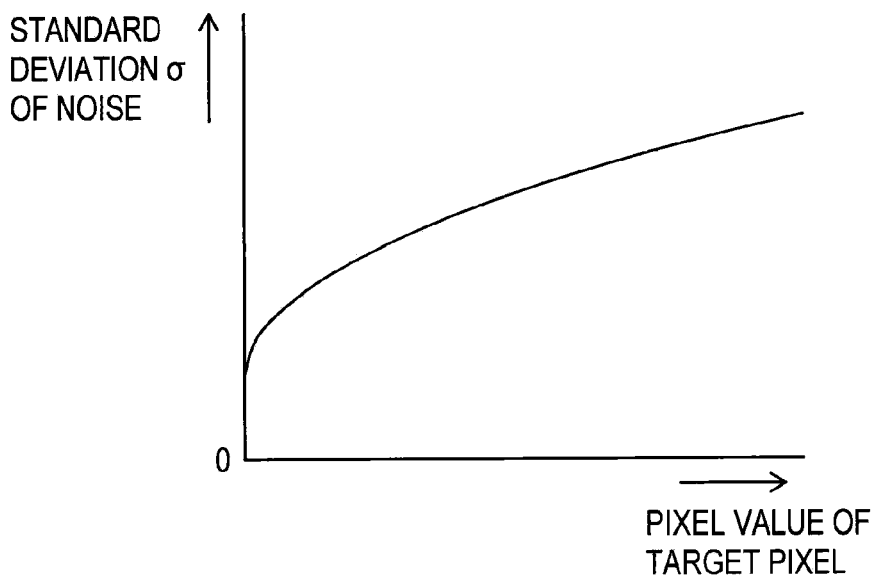
FIG. 11 is a graph showing change of standard deviation of noise with reference to a pixel value of a target pixel.

Further, as shown in FIG. 10, the distribution of noise mixed in the digital image indicates a normal distribution in which the noise existence probability with reference to true value of the target pixel becomes maximum. As shown in FIG. 11, as the pixel value of the target pixel increases, the standard deviation σ of noise increases.

However, in the image processing apparatus using the above-described ε filter, it has not been considered that the standard deviation σ of noise changes due to the pixel value of the target pixel and by setting the noise judgment value to a specified value, random noise is removed. In a region in which the pixel value of the target pixel is small, threshold specified by the noise judgment value is set to a higher value than an optimum value as compared with a region in which the pixel value is larger. Thus, correction of the digital image becomes excessive in addition to noise, thereby providing a fear that the density of the digital image may drop.

Additionally, in the region in which the pixel value of the target pixel is large, the threshold specified by the noise judgment value is set to a lower value than the optimum value as compared with the region in which the pixel value is small. Consequently, noise cannot be removed sufficiently, so that the digital image might be unclear.

First Embodiment

Figure 1:
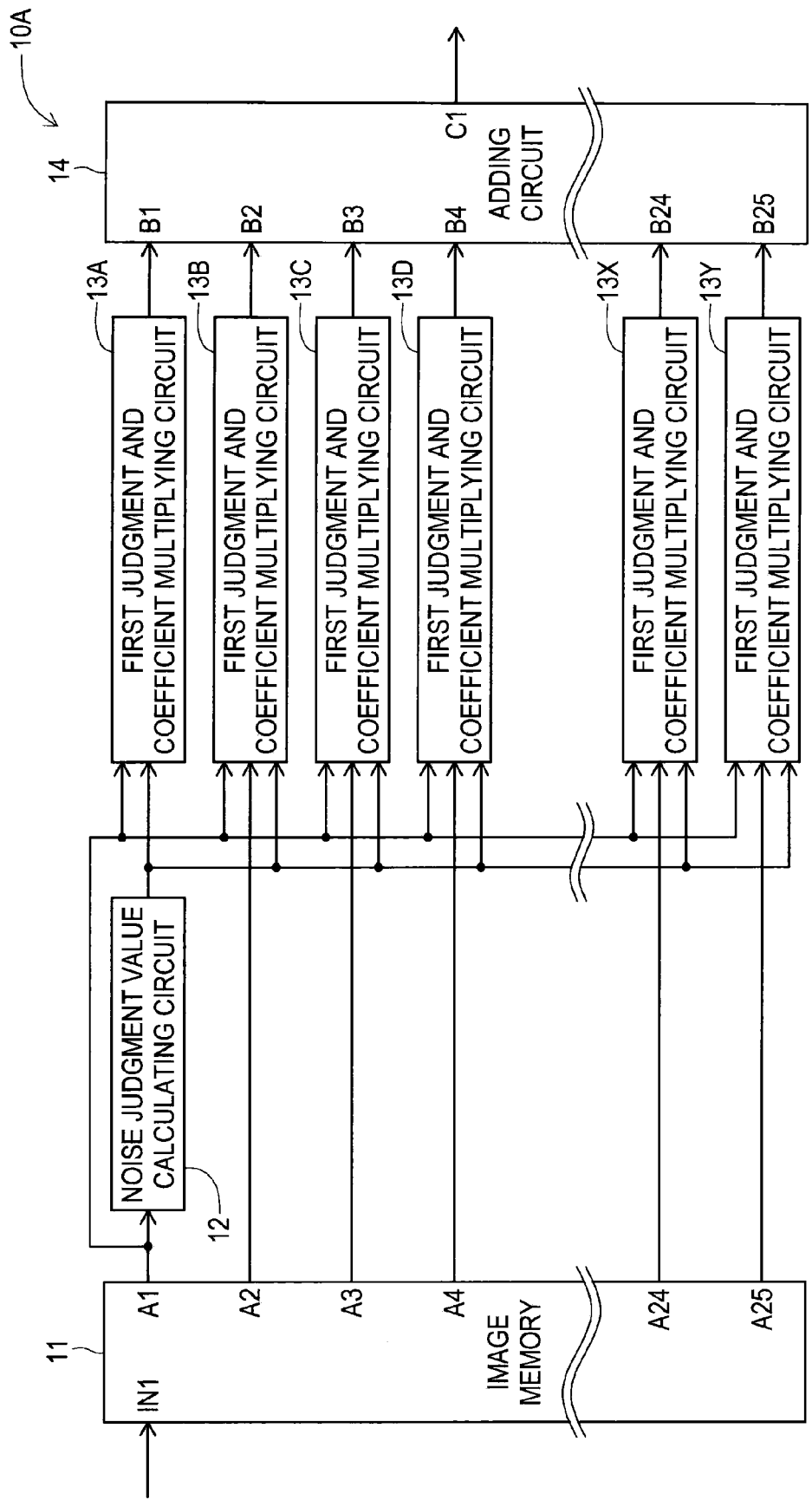
FIG. 1 is a schematic diagram of an image processing apparatus directed to first embodiment.

A first embodiment will be described with reference to FIG. 1-FIG. 4. The image processing apparatus of this embodiment will be described by taking an image processing apparatus 10A loaded on a digital camera. FIG. 1 is a block diagram showing the configuration of an image processing apparatus 10A of the first embodiment. The image processing apparatus 10A comprises an image memory 11, a noise judgment value calculating circuit 12, first judgment and coefficient multiplying circuits 13A-13Y and an adding circuit 14.

The image memory 11 is constituted of SRAM and FF. In the meantime, an output of a signal converting portion which processes a signal from an image sensor is connected to an input terminal IN1 of the image memory 11, which is not shown in the figure.

An input terminal of a noise judgment value calculating circuit 12 is connected to a target pixel value output terminal A1 of the image memory 11. According to the first embodiment, a noise judgment value calculating circuit 12 is constituted of a lookup table memory.

A first input terminal of the first judgment and coefficient multiplying circuit 13A is connected to a target pixel value output terminal A1 of the image memory 11. A second input terminal of the first judgment and coefficient multiplying circuit 13A is connected to an output terminal of the noise judgment value calculating circuit 12.

A first input terminal of the first judgment and coefficient multiplying circuit 13B is connected to the target pixel value output terminal A1 of the image memory 11. A second input terminal of the first judgment and coefficient multiplying circuit 13B is connected to a surrounding pixel value output terminal A2 of the image memory 11. Further, a third input terminal of the first judgment and coefficient multiplying circuit 13B is connected to an output terminal of the noise judgment value calculating circuit 12.

Each first input terminal of the first judgment and coefficient multiplying circuits 13C-13Y is connected to the target pixel value output terminal A1 of the image memory 11 like the first input terminal of the first judgment and coefficient multiplying circuit 13B. Each second input terminal of the first judgment and coefficient multiplying circuits 13C-13Y is connected to each surrounding pixel value output terminals A3-A25 of the pixel memory 11. Further, each third input terminal of the first judgment and coefficient multiplying circuits 13C-13Y is connected to an output terminal of the noise judgment value calculating circuit 12.

An input terminal B1 of the adding circuit 14 is connected to an output terminal of the first judgment and coefficient multiplying circuit 13A. Each input terminal B2-B25 of the adding circuit 14 is connected to each output terminal of the first judgment and coefficient multiplying circuits 13B-13Y. In the meantime, a symbol C1 in the Figure denotes an output terminal of the adding circuit 14.

Next, an image processing method of the image processing apparatus 10A of the first embodiment will be described. As described above, an output of a signal converting portion for processing a signal from the image sensor is connected to an input terminal IN1 of the image memory 11. Then, the digital signal is inputted to the image memory 11 through the input terminal IN1.

The image memory 11 memorizes line data of brightness component generated by the signal converting portion for processing a signal from the image sensor. The line data is constituted of a plurality of pixel values. The image memory 11 memorizes data of the digital image of a photographic object for each line data.

Figures 2, 3:
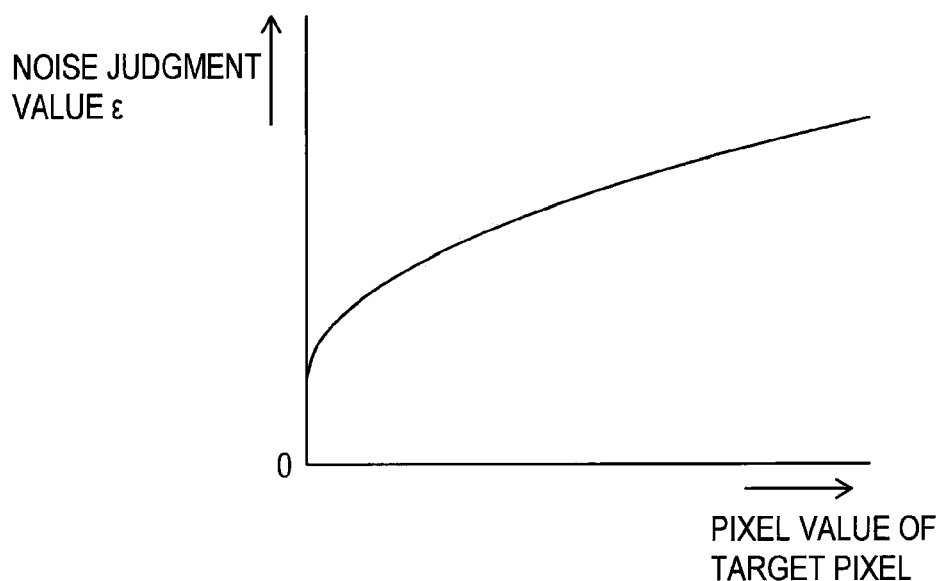
FIG. 2 is a schematic diagram for illustrating extracted region in digital image used in the first embodiment.
FIG. 3 is a graph showing noise judgment value with reference to pixel value of a target pixel.

In the image processing apparatus 10A of this embodiment, as shown in FIG. 2, the image memory 11 extracts a 5×5 region having five pixels in each of the X direction and Y direction from digital image data memorized in the image memory 11. P22 in the Figure indicates target pixel value data and all signs P00-P44 except P22 indicate surrounding pixel value data. In this embodiment, the target pixel value data P22 deprived of noise data corresponds to a real value of the target pixel of this embodiment.

Further, in the image processing apparatus 10A, the image memory 11 outputs the target pixel value data P22 from the target pixel value output terminal A1 to the noise judgment value calculating circuit 12 and each first judgment and coefficient multiplying circuit 13A-13Y. Additionally, the image memory 11 is controlled by the CPU and outputs the surrounding pixel value data P00 and the like from each surrounding pixel value output terminal A2-A25 to each first judgment and coefficient multiplying circuit 13B-13Y.

A noise judgment value ε corresponding to the target pixel value data P22 outputted by the image memory 11 is memorized as a lookup table in the noise judgment value calculating circuit 12. The noise judgment value calculating circuit 12 reads out a noise judgment value ε from the lookup table corresponding to the target pixel value data P22 and outputs the noise judgment ε to the respective first judgment and coefficient multiplying circuits 13A-13Y. In the meantime, the noise judgment value ε is set at ±3σ. As the pixel value (P22) of the target pixel increases, as shown in FIG. 3, the noise judgment value ε increases. The σ is a standard deviation of noise.

As described above, the target pixel value data P22 and data of the noise judgment value ε are inputted to the first judgment and coefficient multiplying circuit 13A. The target pixel value data P22, surrounding pixel value data P00 and the like, and data of the noise judgment value $\epsilon$ are inputted to the respective first judgment and coefficient multiplying circuits 13B-13Y.

First, the first judgment and coefficient multiplying circuit 13A subtracts the pixel value (P22) of the target pixel from the pixel value (P22) of the target pixel. Next, the first judgment and coefficient multiplying circuit 13A compares an absolute value of the subtraction result with the noise judgment value $\epsilon$. The first judgment and coefficient multiplying circuit 13A determines that the absolute value is below the noise judgment value $\epsilon$ and selects the pixel value of the target pixel.

Figure 4:
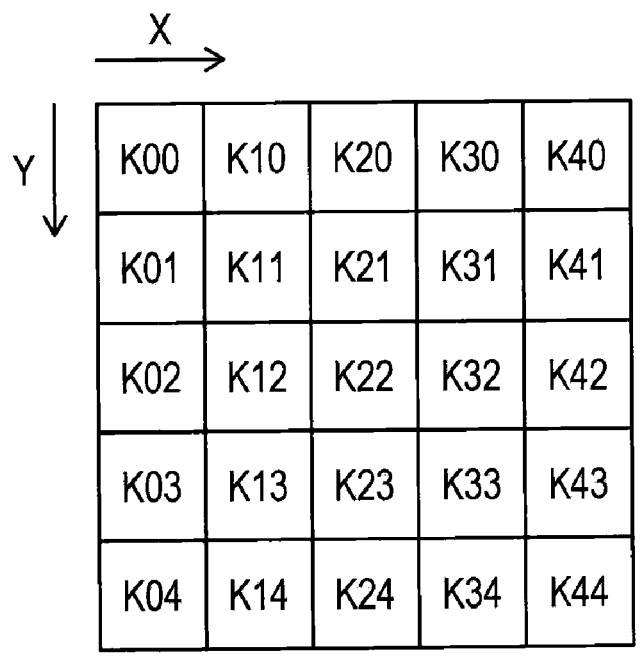
FIG. 4 is a schematic diagram for illustrating filter table used in the first embodiment.

Subsequently, the first judgment and coefficient multiplying circuit 13A multiplies a filter coefficient K22 (see FIG. 4) corresponding to the pixel value of the target pixel by the pixel value of the target pixel. After that, the first judgment and coefficient multiplying circuit 13A outputs a value of multiplication result to the input terminal B1 of the adding circuit 14. In the meantime, the first judgment and coefficient multiplying circuit 13A memorizes the filter coefficient K22 corresponding to the pixel value (P22) of the target pixel and filter coefficients (K00-K44 except K22) corresponding to the pixel values (P00-P44 except P22) of the surrounding pixels as a filter table as shown in FIG. 4. According to this embodiment, each filter coefficient is set to ⅟25 and weighting of each filter coefficient is the same.

The first judgment and coefficient multiplying circuit 13B subtracts the pixel value (P22) of the target pixel from the pixel value (P00) of the surrounding pixel. Next, the first judgment and coefficient multiplying circuit 13B compares the absolute value of the subtraction result with the noise judgment value $\epsilon$. The first judgment and coefficient multiplying circuit 13B selects the pixel value (P00) of the surrounding pixel when it judges that the absolute value is below the noise judgment value $\epsilon$. When the first judgment and coefficient multiplying circuit 13B judges that the absolute value is below the noise judgment value $\epsilon$, it judges that the pixel value (P00) of the surrounding pixel is a value allowed to the pixel value (P22) of the target pixel. Therefore, the noise judgment value $\epsilon$ means a pixel width allowed to the pixel value of the target pixel.

Subsequently, the first judgment and coefficient multiplying circuit 13B multiplies a pixel value (P00) of the surrounding pixel by the filter coefficient K00 (see FIG. 4) corresponding to the pixel value (P00) of the surrounding pixel. After that, the first judgment and coefficient multiplying circuit 13B outputs a value of the multiplication result to the input terminal B2 of the adding circuit 14.

On the other hand, the first judgment and coefficient multiplying circuit 13B selects the pixel value (P22) of the target pixel when it judges that the absolute value is larger than the noise judgment value $\epsilon$. Subsequently, the first judgment and coefficient multiplying circuit 13B multiplies the pixel value (P22) of the target pixel by the filter coefficient K22 corresponding to the pixel value (P22) of the target pixel. After that, the first judgment and coefficient multiplying circuit 13B outputs a value of the multiplication result to the input terminal B2 of the adding circuit 14.

The respective first judgment and coefficient multiplying circuits 13C-13Y subtract the pixel value (P22) of the target pixel from the pixel values (P10-P44 except P00 and P22) of the surrounding pixels like the first judgment and coefficient multiplying circuit 13B. Next, the first judgment and coefficient multiplying circuits 13C-13Y compare an absolute value of a subtraction result with the noise judgment value $\epsilon$. The respective first judgment and coefficient multiplying circuits 13C-13Y select the pixel values (P10-P44) of the surrounding pixels when it is judged that each absolute value is below the noise judgment value $\epsilon$.

Subsequently, the respective first judgment and coefficient multiplying circuits 13C-13Y multiply the pixel values (P10-P44) of the surrounding pixels by the filter coefficients K10-K44 (see FIG. 4) corresponding to the pixel values (P10-P44) of the surrounding pixels. After that, the respective first judgment and coefficient multiplying circuits 13C-13Y output a value of a multiplication result to the respective input terminals B3-B25 of the adding circuit 14.

On the other hand, the respective first judgment and coefficient multiplying circuits 13C-13Y select the pixel value (P22) of the target pixel when it is judged that the absolute value is larger than the noise judgment value $\epsilon$. Subsequently, the respective first judgment and coefficient multiplying circuits 13C-13Y multiply the pixel value (P22) of the target pixel by the filter coefficient K22 corresponding to the pixel value (P22) of the target pixel. After that, the respective first judgment and coefficient multiplying circuits 13C-13Y outputs a value of the multiplication result to the input terminals B3-B25 of the adding circuit 14.

The adding circuit 14 adds values of all multiplication results inputted through the input terminals B1-B25 together. The added values turn to a pixel value (see P22', FIG. 2) of a target pixel from which noise mixed in the digital image is reduced. The adding circuit 14 outputs the target pixel value data P22' from the output terminal C1.

The adding circuit 14 extracts each 5×5 region throughout the entire area of the digital image and calculates the pixel value (P22') of the target pixel. The adding circuit 14 outputs data of the pixel value (P22') of a calculated target pixel from the output terminal C1 successively. The image processing apparatus 10A of this embodiment restores the digital image using the pixel value (P22') of the target pixel so as to improve the S/N ratio. In this embodiment, the respective first judgment and coefficient multiplying circuits 13A-13Y and the adding circuit 14 constitute a spatial filter. The respective first judgment and coefficient multiplying circuits 13A-13Y and the adding circuit 14 calculate the pixel value (P22') of the target pixel successively by product sum operation on each filter coefficient weighted equally and each pixel value in the 5×5 region of the digital image. Then, the respective first judgment and coefficient multiplying circuits 13A-13Y corresponds to the smoothing filter of this embodiment because the product sum operation result can be obtained by weighted averaging of all pixel values by weighting each filter coefficient equally.

In this embodiment, the noise judgment value calculating circuit 12 selects a pixel width (noise judgment value $\epsilon$) allowed to the pixel value (P22) of the target pixel by reading according to the lookup table. Thus, the noise judgment value calculating circuit 12 which selects the noise judgment value $\epsilon$ corresponds to the selecting portion of this embodiment. In this embodiment, selecting a pixel width (noise judgment value $\epsilon$) allowed to the pixel value (P22) of the target pixel by reading according to the lookup table corresponds to the selecting step of this embodiment.

In this embodiment, the first judgment and coefficient multiplying circuits 13A-13Y compare the noise judgment value E inputted by the noise judgment value calculating circuit 12 with the aforementioned absolute value. After that, based on a comparison result of the noise judgment value $\epsilon$ and the absolute value, the first judgment and coefficient multiplying circuits 13A-13Y are used for calculating the pixel value (P22') of the target pixel for reducing noise mixed in the digital image of an object and restoring the digital image and selects the pixel value (P22) of the target pixel to be multiplied by a filter coefficient and pixel values (P00-P44 except P22) of the surrounding pixels. Because the first judgment and coefficient multiplying circuits 13A-13Y select the pixel value of the surrounding pixel and the pixel value of the target pixel for use in restoring the digital image by reducing noise, they correspond to the correcting section of this embodiment. In the meantime, according to this embodiment, the pixel values (P00-P44 except P22) of the surrounding pixel and the pixel value (P22) of the target pixel correspond to the correction value of this embodiment.

In this embodiment, selecting the pixel value (P22) of the target pixel and the pixel values (P00-P44 except P22) of the surrounding pixels based on a result of comparison of the noise judgment value $\epsilon$ selected using the lookup table with the absolute value corresponds to the correction step of this embodiment.

Effect of the First Embodiment

In the image processing apparatus 10A of the first embodiment described above, the noise judgment value calculating circuit 12 selects the noise judgment value $\epsilon$ corresponding to the pixel value (P22) of the target pixel. Then, the image processing apparatus 10A of the first embodiment can change the selected noise judgment value $\epsilon$ corresponding to the pixel value (P22) of the target pixel.

In the image processing apparatus 10A of this embodiment, the respective first judgment and coefficient multiplying circuits 13A-13Y select any one or both of the pixel values (P00-P44 except P22) of the surrounding pixels and the pixel value (P22) of the target pixel as a correction value for reducing noise mixed in the pixel value of each 5×5 region corresponding to the noise judgment value $\epsilon$ selected by the noise judgment value calculating circuit 12. Then, the respective first judgment and coefficient multiplying circuits 13A-13Y can change a selected correction value corresponding to the noise judgment value $\epsilon$. The image processing apparatus 10A of this embodiment can correct the pixel value of the target pixel of each 5×5 region according to the correction value selected by the first judgment and coefficient multiplying circuits 13A-13Y so as to obtain the pixel value of the target pixel whose noise is reduced.

According to the image processing method for use in the image processing apparatus 10A of the first embodiment, the noise judgment value $\epsilon$ is read out and selected corresponding to the pixel value (P22) of the target pixel. Then, according to the image processing method of the first embodiment, the selected noise judgment value $\epsilon$ can be changed corresponding to the pixel value (P22) of the target pixel.

According to the image processing method for use in the image processing apparatus 10A of this embodiment, any one or both of the pixel values (P00-P44 except P22) of the surrounding pixels and the pixel value (P22) of the target pixel are selected as the correction value for reducing noise mixed in the pixel value of each 5×5 region corresponding to the selected noise judgment value $\epsilon$. Then, the image processing method of this embodiment can change the selected correction value corresponding to the noise judgment value $\epsilon$. Therefore, the image processing method of this embodiment can correct the pixel value of the target pixel of each 5×5 region according to the selected correction value to obtain the pixel value of the target pixel whose noise is reduced.

In the image processing apparatus 10A of this embodiment, the respective first judgment and coefficient multiplying circuits 13A-13Y set the value of the noise judgment value $\epsilon$ to $\pm 3\sigma$ based on the standard deviation $\sigma$ in distribution of the pixel values of the target pixels. Then, in the image processing apparatus 10A of this embodiment, the first judgment and coefficient multiplying circuits 13A-13Y can set the value of the noise judgment value E to values containing substantially all the pixel values of the target pixels around the real value of the target pixel by setting the noise judgment value $\epsilon$ to $3\sigma$.

Further, according to the image processing method for use in the image processing apparatus 10A of this embodiment, the value of the noise judgment value $\epsilon$ is set to $\pm 3\sigma$ based on the standard deviation $\sigma$ in the distribution of the pixel values of the target pixels. Then, according to the image processing method of this embodiment, the value of the noise judgment value $\epsilon$ can be set to values containing substantially all the pixel values of the target pixels around the real value of the target pixel by setting the noise judgment value $\epsilon$ to $3\sigma$.

In the image processing apparatus 10A of this embodiment, the noise judgment value $\epsilon$ corresponding to the pixel value (P22) of the target pixel is memorized in the noise judgment value calculating circuit 12 as a lookup table. Then, the noise judgment value calculating circuit 12 can select the noise judgment value E corresponding to the pixel value (P22) of the target pixel easily by referring to a correspondence relationship between the pixel value (P22) of the target pixel and the noise judgment value $\epsilon$.

According to the image processing method for use in the image processing apparatus 10A of this embodiment, the noise judgment value $\epsilon$ is selected according to the lookup table which stores the correspondence relationship between the pixel value (P22) of the target pixel and the noise judgment value $\epsilon$. Then, according to the image processing method of this embodiment, the noise judgment value $\epsilon$ to the pixel value (P22) of the target pixel can be selected easily by referring to the correspondence relationship between the pixel value (P22) of the target pixel and the noise judgment value $\epsilon$.

In the image processing apparatus 10A of this embodiment, the first judgment and coefficient multiplying circuits 13B-13Y select any one or both of the pixel value of the surrounding pixel and the pixel value of the target pixel as the correction value, based on a result of comparison of the noise judgment value $\epsilon$ with an absolute value of a result of subtraction of the pixel value (P22) of the target pixel from the pixel values (P00-P44 except P22) of the surrounding pixel. The respective first judgment and coefficient multiplying circuits 13B-13Y can change a correction value for selection, based on a result of comparison of the noise judgment value $\epsilon$ with the absolute value.

Further, according to the image processing method for use in the image processing apparatus 10A of this embodiment, based on a result of comparison of the noise judgment value $\epsilon$ with an absolute value of a result of subtraction of the pixel value (P22) of the target pixel from the pixel values (P00-P44 except P22) of the surrounding pixels, any one or both of the pixel value of the surrounding pixel and the pixel value of the target pixel are selected as the correction value. According to the image processing method of this embodiment, the correction value for selection can be changed based on a result of comparison of the noise judgment value $\epsilon$ with the absolute value.

Under a condition that it is determined that an absolute value of a result of subtraction of the pixel value (P22) of the target pixel from the pixel values (P01-P44 except P22) of the surrounding pixels is below the noise judgment value $\epsilon$ by the respective first judgment and coefficient multiplying circuits 13B-13Y, the image processing apparatus 10A of this embodiment selects each pixel value (P01-P44 except P22) of the surrounding pixels as the correction value. The pixel value of each surrounding pixel selected by the first judgment and coefficient multiplying circuits 13B-13Y is not a pixel value of the target pixel in which excessive noise is mixed, whereby preventing mixture of noise in the correction value.

Under a condition that it is determined that an absolute value of a result of subtraction of the pixel value (P22) of the target pixel from the pixel values (P01-P44 except P22) of the surrounding pixels is larger than the noise judgment value $\epsilon$ by the first judgment and coefficient multiplying circuits 13B-13Y, the image processing apparatus 10A of this embodiment selects each pixel value (P22) of the target pixels as the correction value. Then, the respective first judgment and coefficient multiplying circuits 13B-13Y never select a pixel value of the surrounding pixels in which noise is mixed excessively as the correction value, thereby preventing noise from being mixed in the correction value excessively.

Further, according to the image processing method for use in the image processing apparatus 10A of this embodiment, under a condition that it is determined that the absolute value of a result of subtraction of the pixel value (P22) of the target pixel from the pixel values (P01-P44 except P22) of the surrounding pixels is below the noise judgment value $\epsilon$, the pixel value (P01-P44 except P22) of the surrounding pixel is selected as the correction value. Then, the pixel value of each selected surrounding pixel is not a pixel value of the target pixel in which noise is mixed excessively, thereby making it possible to prevent noise from being mixed in the correction value.

According to the image processing method of this embodiment, under a condition that it is determined that the absolute value of a result of subtraction of the pixel value (P22) of the target pixel from the pixel values (P01-44 except P22) of the surrounding pixels is larger that the noise judgment value $\epsilon$, each pixel value (P22) of the target pixel is selected as the correction value. Then, the pixel value of the surrounding pixels in which noise is mixed excessively is not selected as the correction value, thereby making it possible to prevent noise from being mixed in the correction value.

According to this embodiment, the first judgment and coefficient multiplying circuits 13A-13Y multiply all pixel values composed of any one or both of the pixel value (P00-P44 except P22) of the surrounding pixels selected by the first judgment and coefficient multiplying circuits 13A-13Y and the pixel value (P22) of the target pixel by a filter coefficient equally weighted. After that, the adding circuit 14 calculates averages of the pixel values of each 5×5 region in succession by adding values of all multiplications and adopts the aforementioned average as the pixel value (P22') of the target pixel of each 5×5 region. Then, the image processing apparatus 10A of this embodiment can prevent the pixel value of the surrounding pixels in which noise is mixed from rising excessively by calculating the averages of the pixel values of each 5×5 region in succession so as to calculate the pixel value (P22') of the corrected target pixel. Therefore, in the pixel value (P22') of the corrected target pixel, noise is reduced.

According to the image processing method for use in the image processing apparatus 10A of this embodiment, all pixel values composed of any one or both of the pixel values (P00-P44 except P22) of the selected surrounding pixels and the pixel value (P22) of the target pixel are multiplied by the equally weighted filter coefficient. After that, according to the image processing method of this embodiment, an average of the pixel value of each 5×5 region is calculated successively by adding values of all the multiplication results and the aforementioned average is adopted as the pixel value (P22') of the target pixel of each 5×5 region. Then, according to the image processing method of this embodiment, the pixel value of the surrounding pixels in which noise is mixed can be prevented from rising excessively by calculating the average of the pixel value of each 5×5 region successively so as to calculate the pixel value (P22') of the corrected target pixel. Therefore, in the pixel value (P22') of the corrected target pixel, noise is reduced.

Second Embodiment

Figure 5:
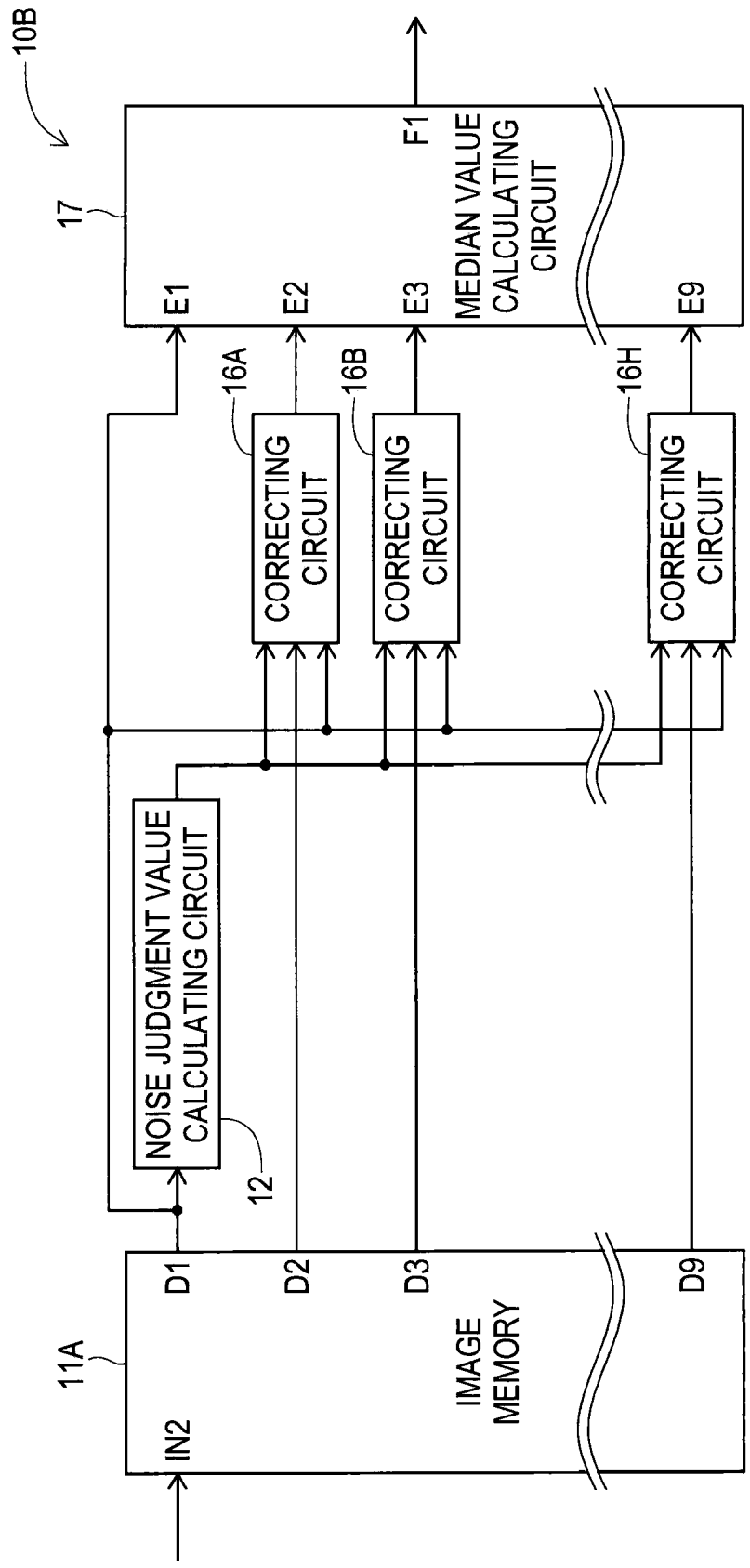
FIG. 5 is a schematic diagram of an image processing apparatus directed to second embodiment.

A second embodiment will be described with reference to FIGS. 5, 6. FIG. 5 is a block diagram showing the configuration of an image processing apparatus 10B of the second embodiment. Like reference numerals are attached to the same composition as the first embodiment and description thereof is omitted. As shown in the same Figure, the image processing apparatus 10B comprises an image memory 11A, a noise judgment value calculating circuit 12, correcting circuits 16A-16H and a median value calculating circuit 17.

The image memory 11A is constituted of SRAM and FF like the image memory 11 of the first embodiment. An output of a signal converting portion for processing a signal from the image sensor is connected to an input terminal IN2 of the image memory 11A. Further, an input terminal of the noise judgment value calculating circuit 12 is connected to a target pixel value output terminal D1 of the image memory 11A.

A first input terminal of the correction circuit 16A is connected to an output terminal of the noise judgment value calculating circuit 12. A second input terminal of the correction circuit 16A is connected to a surrounding pixel value output terminal D2 of the image memory 11A. A third input terminal of the correction circuit 16A is connected to a target pixel value output terminal D1 of the image memory 11A.

Each first input terminal of the correction circuits 16B-16H is connected to the output terminal of the noise judgment value calculating circuit 12 like the first input terminal of the correction circuit 16A. Each second input terminal of the correction circuits 16B-16H is connected to surrounding pixel value output terminals D2-D9 of the image memory 11A. Further, each third input terminal of the correction circuits 16B-16H is connected to a target pixel value output terminal D1 of the image memory 11A.

An input terminal E1 of the median value calculating circuit 17 is connected to the target pixel value output terminal D1 of the image memory 11A. Input terminals E2-E9 of the median value calculating circuit 17 are connected to output terminals of the correction circuits 16A-16H. According to the second embodiment, the median value calculating circuit 17 is constituted of a median filter. In the meantime, symbol F1 in the same Figure denotes an output terminal of the median value calculating circuit 17.

Next, an image processing method of the image processing apparatus 10B of the second embodiment will be described. The image memory 11A memorizes data of digital image of a photographic object in each line data like the image memory 11 of the first embodiment.

Figure 6:
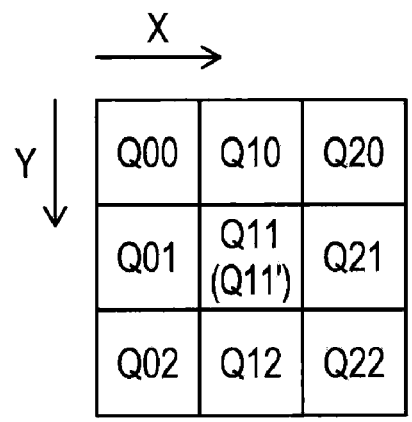
FIG. 6 is a schematic diagram for illustrating an extracted region in a digital image used in the second embodiment.

In the image processing apparatus 10B of this embodiment, as shown in FIG. 6, the image memory 11A extracts a 3×3 region having three pixels each in the X direction and Y direction from data of digital image memorized in the image memory 11A. Q11 in the same Figure indicates the target pixel value data and all symbols Q00-Q22 except Q11 indicate surrounding pixel value data. According to this embodiment, the target pixel value data Q11 from which noise data is reduced corresponds to the real value of the target pixel of this embodiment.

In the image processing apparatus 10B, the image memory 11A outputs the target pixel value data Q11 from the target pixel value output terminal D1 to the noise judgment value calculating circuit 12, the correction circuits 16A-16H and the input terminal E1 of the median value calculating circuit 17. Additionally, the image memory 11A outputs surrounding pixel value data Q00 and the like from the surrounding pixel value output terminals D2-D9 to the correction circuits 16A-16H.

The noise judgment value ε corresponding to the target pixel value data Q11 is memorized in the noise judgment value calculating circuit 12 as a lookup table. The noise judgment value calculating circuit 12 reads out the noise judgment value ε from the lookup table corresponding to the target pixel value data Q11 and outputs data of the noise judgment value ε to the correction circuits 16A-16H.

As described above, data of the noise judgment value ε, surrounding pixel value data Q00 and the like, and target pixel value data Q11 are inputted into the correction circuits 16A-16H.

The correction circuit 16A subtracts the pixel value (Q11) of the target pixel from the pixel value (Q00) of the surrounding pixel first. Next, the correction circuit 16A compares an absolute value of a subtraction result with the noise judgment value ε. The correction circuit 16A selects the pixel value (Q00) of the surrounding pixels when it judges that the absolute value is below the noise judgment value ε. After that, the correction circuit 16A outputs surrounding pixel value data Q00 to the input terminal E2 of the median value calculating circuit 17.

On the other hand, the correction circuit 16A selects the pixel value (Q11) of the target pixel when it judges that the absolute value is larger than the noise judgment value ε. After that, the correction circuit 16A outputs the target pixel value data Q11 to the input terminal E2 of the median value calculating circuit 17.

The correction circuits 16B-16H subtract the pixel value (Q11) of the target pixel from the pixel value of the surrounding pixels (Q01-Q22 except Q00) like the above-described correction circuit 16A. Next, the correction circuits 16B-16H compare the absolute value of the subtraction result with the noise judgment value ε. The correction circuits 16B-16H select the pixel value (Q01-Q22 except Q00) of the surrounding pixel when it judges that each absolute value is below the noise judgment value ε. After that, the correction circuits 16B-16H outputs the surrounding pixel value data Q10-Q22 to the input terminals E3-E9 of the median value calculating circuit 17.

On the other hand, when the respective correction circuits 16B-16H judge that the absolute value is larger than the noise judgment value ε, each of them selects the pixel value (Q11) of the target pixel. After that, the correction circuits 16B-16H outputs the target pixel value data Q11 to the input terminals E2-E9 of the median value calculating circuit 17.

As described above, the target pixel value data is inputted to the median value calculating circuit 17 through the input terminal E1. As described above, the surrounding pixel data or target pixel value data is inputted to the median value calculating circuit 17 by the correction circuits 16A-16H corresponding to a result of comparison of an absolute value of a result of subtraction of the pixel value of the target pixel from the pixel value of the surrounding pixel with the noise judgment value ε through the input terminals E2-E9. The median value calculating circuit 17 rearranges all the inputted pixel values in the descending order. Then, the median value calculating circuit 17 obtains a median value (intermediate value) within the rearranged values as a pixel value (Q11') of the target pixel of a 3×3 region. The median value (intermediate value) is obtained as the pixel value (Q11') of the target pixel in order to reduce noise mixed in the digital image. Subsequently, the median value calculating circuit 17 outputs the median value data 11' from the output terminal F1.

The median value calculating circuit 17 extracts each 3×3 region from the entire area of the digital image so as to obtain the median value successively as the pixel value (Q11') of the target pixel as described above. The median value calculating circuit 17 outputs the calculated target pixel value data Q11' successively from the output terminal F1. The image processing apparatus 10B of this embodiment restores the digital image so as to improve the S/N ratio using the median value.

In this embodiment, the correction circuits 16A-16H correspond to the correction section of this embodiment because they select the pixel values of the surrounding pixels or the pixel value of the target pixel as a median value for use in restoration of the digital image corresponding to a result of comparison of the absolute value of a result of subtraction of the pixel value of the target pixel from the pixel value of the surrounding pixels with the noise judgment value ε. In this embodiment, the pixel values (Q01-Q22 except Q11) of the surrounding pixels and the pixel value (Q11) of the target pixel correspond to the correction value of this embodiment. Further, in this embodiment, the noise judgment value calculating circuit 12 reads out and selects a pixel width (noise judgment value ε) allowed to the pixel value (Q11) of the target pixel according to the lookup table. Thus, the noise judgment value calculating circuit 12 for selecting the noise judgment value E corresponds to the selecting section of this embodiment.

In this embodiment, selecting of the pixel value of the surrounding pixel or the pixel value of the target pixel as the median value for use in restoration of the digital image corresponding to a result of comparison of an absolute value of a result of subtraction of the pixel value of the target pixel from the pixel value of the surrounding pixel with the noise judgment value ε corresponds to the correction step of this embodiment. Further, in this embodiment, reading and selecting a pixel width (noise judgment value ε) allowed to the pixel value (Q11) of the target pixel according to the lookup table corresponds to the selecting step of this embodiment.

<Effect of the Second Embodiment>

In the image processing apparatus 10B of the second embodiment described above, the noise judgment value calculating circuit 12 reads out and selects the noise judgment value ε corresponding to the pixel value (Q11) of the target pixel. Then, the image processing apparatus 10B of the second embodiment can change the selected noise judgment value corresponding to the pixel value (Q11) of the target pixel.

In the image processing apparatus 10B of this embodiment, the correction circuits 16A-16H select any one or both of the pixel values (Q00-Q22 except Q11) of the surrounding pixels and the pixel value (Q11) of the target pixel as a correction value for reducing noise mixed in the pixel value of each 3×3 region, corresponding to the noise judgment value ε selected by the noise judgment value calculating circuit 12. The correction circuits 16A-16H can change the correction value for selection corresponding to the noise judgment value ε. Therefore, the image processing apparatus 10B of this embodiment can correct the pixel value of the target pixel of each 3×3 region according to the correction value selected by the correction circuits 16A-16H to obtain the pixel value of the target pixel whose noise is reduced.

According to the image processing method for use in the image processing apparatus 10B of the second embodiment, the noise judgment value ε is read out and selected corresponding to the pixel value (Q11) of the target pixel. Then, according to the image processing method of the second embodiment, the selected noise judgment value E can be changed corresponding to the pixel value (Q11) of the target pixel.

According to the image processing method for use in the image processing apparatus 10B of this embodiment, any one or both of the pixel values (Q00-Q22 except Q11) of the surrounding pixels and the pixel value (Q11) of the target pixel are selected as a correction value for reducing noise mixed in the pixel value of each 3×3 region, corresponding to the selected noise judgment value ϵ. The image processing method of this embodiment enables the correction value for selection to be changed corresponding to the noise judgment value ϵ. Therefore, according to the image processing method of this embodiment, the pixel value of the target pixel of each 3×3 region can be corrected according to the selected correction value to obtain the pixel value of the target pixel whose noise is reduced.

In the image processing apparatus 10B of this embodiment, the correction circuits 16A-16H select any one or both of the pixel values of the surrounding pixels and the pixel value of the target pixel as the correction value, based on a result of comparison of the noise judgment value ϵ with an absolute value of a result of subtraction of the pixel value (Q11) of the target pixel from the pixel values (Q00-Q22 except Q11) of the surrounding pixels. Then, the correction circuits 16A-16H can change the correction value to be selected, based on a result of comparison of the noise judgment value ϵ with the absolute value.

According to the image processing method for use in the image processing apparatus 10B of this embodiment, any one or both of the pixel values of the surrounding pixels and the pixel value of the target pixel are selected as the correction value, based on a result of comparison of the noise judgment value ϵ with an absolute value of a result of subtraction of the pixel value (Q11) of the target pixel from the pixel values (Q00-Q22 except Q11) of the surrounding pixels. Then, according to the image processing method of this embodiment, the correction value to be selected can be changed based on a result of comparison of the noise judgment value ϵ with the absolute value.

Under a condition that it is judged that the absolute value of a result of subtraction of the pixel value (Q11) of the target pixel from the pixel values (Q00-Q22 except Q11) of the surrounding pixels is below the noise judgment value ϵ by the correction circuits 16A-16H, the image processing apparatus 10B of this embodiment selects the pixel values (Q00-Q22 except Q11) of the surrounding pixels as the correction value. Then, the pixel value of each surrounding pixel selected by the correction circuits 16A-16H is not a pixel value of the target pixel in which excessive noise is mixed, and thus mixing of noise into the correction value can be prevented.

Further, under a condition that it is judged that the absolute value of a result of subtraction of the pixel value (Q11) of the target pixel from the pixel values (Q00-Q22 except Q11) of the surrounding pixels is larger than the noise judgment value ϵ by the correction circuits 16A-16H, the image processing apparatus 10B of this embodiment selects the pixel value (Q11) of the target pixel as the correction value. Then, the correction circuits 16A-16H never select a pixel value of surrounding pixels in which excessive noise is mixed and thus, mixing of noise into the correction value can be prevented.

According to the image processing method for use in the image processing apparatus 10B of this embodiment, under a condition that it is judged that an absolute value of a result of subtraction of the pixel value (Q11) of the target pixel from the pixel values (Q00-Q22 except Q11) of the surrounding pixels is below the noise judgment value ϵ, each pixel value (Q00-Q22 except Q11) of the surrounding pixel is selected as the correction value. Then, the pixel value of each selected surrounding pixel is not the pixel value of a target pixel in which excessive noise is mixed, and thus, mixing of noise into the correction value can be prevented.

According to the image processing method of this embodiment, under a condition that it is judged that an absolute value of a result of subtraction of the pixel value (Q11) of the target pixel from the pixel values (Q00-Q22 except Q11) of the surrounding pixels is larger than the noise judgment value ϵ, the pixel value (Q11) of the target pixel is selected as the correction value. Then, the pixel value of the surrounding pixel in which excessive noise is mixed is never selected as the correction value and then, mixing of noise into the correction value can be prevented.

In the image processing apparatus 10B of this embodiment, the median value calculating circuit 17 obtains a median value from all the pixel values composed of any one or both of the pixel values (Q00-Q22 except Q11) of the surrounding pixels selected by the correction circuits 16A-16H and the pixel value (Q11) of the target pixel. Then, the image processing apparatus 10B of this embodiment obtains the median values of each 3×3 region successively while the median value is set at a pixel value (Q11') of the target pixel of each 3×3 region. Then, the median value obtained by the median value calculating circuit 17 has a reduced noise as compared with the pixel value of the surrounding pixels in which noise is mixed. Thus, in the image processing apparatus 10B of this embodiment, the pixel value (Q11') of the target pixel determined by the median value has a reduced noise.

According to the image processing method for use in the image processing apparatus 10B of this embodiment, the median value is obtained from all the pixel values composed of any one or both of the selected pixel values (Q00-Q22 except Q11) of the surrounding pixels and the pixel value (Q11) of the target pixel. Then, according to the image processing method of this embodiment, the median values of each 3×3 region is obtained successively while the median value is set at a pixel value (Q11') of the target pixel of each 3×3 region. Then, the obtained median value has a reduced noise as compared with the pixel value of the surrounding pixels in which noise is mixed. Thus, according to the image processing method of this embodiment, the pixel value (Q11') of the target pixel determined by the median value has a reduced noise.

Third Embodiment

Figure 7:
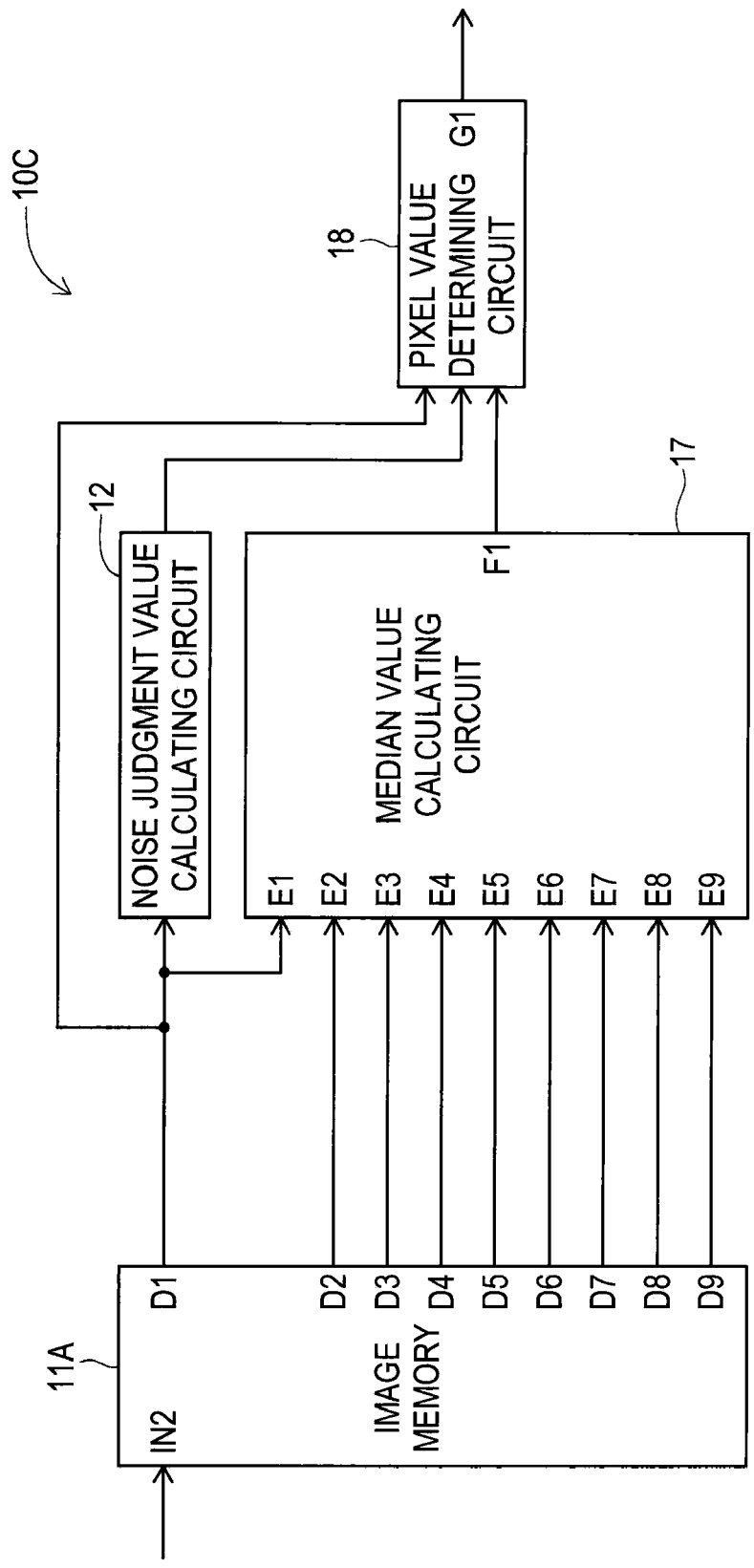
FIG. 7 is a schematic diagram of an image processing apparatus directed to a third embodiment.

A embodiment will be described with reference to FIG. 7. FIG. 7 is a block diagram showing the configuration of an image processing apparatus 10C of the third embodiment. Like reference numerals are attached to the same composition as the first embodiment and the second embodiment and description thereof is omitted. As shown in the same Figure, the image processing apparatus 10C comprises the image memory 11A, the noise judgment value calculating circuit 12, the median value calculating circuit 17 and a pixel value determining circuit 18.

An output of the signal converting portion for processing a signal of the image sensor is connected to the image memory 11A like the second embodiment. An input terminal of the noise judgment value calculating circuit 12 is connected to the target pixel value output terminal D1 of the image memory 11A. An input terminal E1 of the median value calculating circuit 17 is connected to the target pixel value output terminal D1 of the image memory 11A. The respective input terminals E2-E9 of the median value calculating circuit 17 are connected to the surrounding pixel value output terminals D2-D9 of the image memory 11A.

A first input terminal of the pixel value determining circuit 18 is connected to the target pixel value output terminal D1 of the image memory 11A. A second input terminal of the pixel value determining circuit 18 is connected to an output terminal of the noise judgment value calculating circuit 12. A third input terminal of the pixel value determining circuit 18 is connected to an output terminal F1 of the median value calculating circuit 17. In the meantime, a symbol G1 in the same Figure denotes an output terminal of the pixel value determining circuit 18.

Next, the image processing method of the image processing apparatus 10C of the third embodiment will be described. In the image processing apparatus 10C of this embodiment, a 3×3 region having three pixels each in the X direction and Y direction is extracted from data of digital image memorized in the image memory 11A like the second embodiment.

Further, in the image processing apparatus 10C, the image memory 11A outputs the target pixel value data Q11 from the target pixel value output terminal D1 to the noise judgment value calculating circuit 12, the input terminal E1 of the median value calculating circuit 17 and the first input terminal of the pixel value determining circuit 18. Additionally, the image memory 11A outputs the surrounding pixel value data Q00 and the like from the surrounding pixel value output terminals D2-D9 to the input terminals E2-E9 of the median value calculating circuit 17.

The noise judgment value calculating circuit 12 outputs data of the noise judgment value $\epsilon$ to the second input terminal of the pixel value determining circuit 18. The target pixel value data Q11 is inputted to the median value calculating circuit 17 through the input terminal E1. Additionally, as described above, the surrounding pixel value data Q00 and the like are inputted to the median value calculating circuit 17 through the input terminals E2-E9. The median value calculating circuit 17 obtains a median value like the second embodiment. After that, the median value calculating circuit 17 outputs data of the median value from the output terminal F1 to the third input terminal of the pixel value determining circuit 18.

As described above, the target pixel value data Q11, data of the noise judgment value $\epsilon$ and data of the median value are inputted to the pixel value determining circuit 18. First, the pixel value determining circuit 18 subtracts the pixel value (Q11) of the target pixel from the median value. Next, the pixel value determining circuit 18 compares an absolute value of the subtraction result with the noise judgment value $\epsilon$. The pixel value determining circuit 18 selects a median value when it judges that the absolute value is below the noise judgment value $\epsilon$. After that, the pixel value determining circuit 18 outputs data of the median value from the output terminal G1.

On the other hand, the pixel value determining circuit 18 selects the pixel value (Q11) of the target pixel when it judges that the absolute value is larger than the noise judgment value $\epsilon$. After that, the pixel value determining circuit 18 outputs the target pixel value data Q11 from the output terminal G1.

In the image processing apparatus 10C of this embodiment, the median value calculating circuit 17 extracts each 3×3 region from the entire area of a digital image of a photographic object to obtain a median value for each 3×3 region. Then, the pixel value determining circuit 18 compares an absolute value of the subtraction result with the noise judgment value $\epsilon$ successively and selects the pixel value (Q11) of the median value or the target pixel as the pixel value (Q11') of the target pixel corresponding to a comparison result. After that, the pixel value determining circuit 18 outputs data of the median value or the target pixel data Q11 successively from the output terminal F1. The median value or the pixel value (Q11) of the target pixel is selected as the pixel value (Q11') of the target pixel in order to reduce noise mixed in the digital image. The image processing apparatus 10C restores the digital image using the median value or the pixel value (Q11) of the target pixel to improve the S/N ratio.

In this embodiment, the pixel value determining circuit 18 corresponds to the correcting section of this embodiment because it selects the median value or pixel value (Q11) of the target pixel for use in restoration of digital image corresponding to a result of comparison of an absolute value of a result of subtraction of the pixel value (Q11) of the target pixel from the median value with the noise judgment value $\epsilon$. In this embodiment, the median value and the pixel value (Q11) of the target pixel correspond to the correction value of this embodiment. The noise judgment value calculating circuit 12 corresponds to the selecting section of this embodiment like the second embodiment.

In this embodiment, selecting the median value or the pixel value (Q11) of the target pixel for use in restoration of digital image corresponding to a result of comparison of a result of subtraction of the pixel value (Q11) of the target pixel from the median value with the noise judgment value $\epsilon$ corresponds to the correcting step of this embodiment. In the meantime, in this embodiment, the selecting step of this embodiment is constituted of the same processing as the second embodiment.

Effect of the Third Embodiment

In the image processing apparatus 10C of the third embodiment described above, the noise judgment value calculating circuit 12 reads and selects the noise judgment value $\epsilon$ corresponding to the pixel value (Q11) of the target pixel. The image processing apparatus 10C of the third embodiment can change the noise judgment value E to be selected, corresponding to the pixel value (Q11) of the target pixel.

In the image processing apparatus 10C of this embodiment, the pixel value determining circuit 18 selects any one of any median value within the pixel values (Q00-Q22 except Q11) of the surrounding pixels and the pixel value (Q11) of the target pixel as a correction value for reducing noise mixed in the pixel value of each 3×3 region, corresponding to the noise judgment value $\epsilon$ selected by the noise judgment value calculating circuit 12. Then, the pixel value determining circuit 18 can change the correction value to be selected, corresponding to the noise judgment value $\epsilon$. Thus, the image processing apparatus 10C of this embodiment can correct the pixel value of the target pixel in each 3×3 region according to the correction value selected by the pixel value determining circuit 18. Consequently, the pixel value of the target pixel after correction has a reduced noise.

According to the image processing method for use in the image processing apparatus 10C of the third embodiment, the noise judgment value $\epsilon$ is read out and selected corresponding to the pixel value (Q11) of the target pixel. Then, the image processing method of the third embodiment can change the noise judgment value $\epsilon$ to be selected, corresponding to the pixel value (Q11) of the target pixel.

According to the image processing method for use in the image processing apparatus 10C of this embodiment, any one of any median value within the pixel values (Q00-Q22 except Q11) of the surrounding pixels and the pixel value (Q11) of the target pixel is selected as a correction value for reducing noise mixed in the pixel value of each 3×3 region corresponding to the selected noise judgment value ϵ. Then, the image processing method of this embodiment can change the correction value to be selected corresponding to the noise judgment value ϵ. Thus, according to the image processing method of this embodiment, the pixel value of the target pixel of each 3×3 region can be corrected according to the selected correction value. Consequently, the pixel value of the target pixel after correction has a reduced noise.

In the image processing apparatus 10C of this embodiment, the pixel value determining circuit 18 selects the median value or the pixel value (Q11) of the target pixel as the correction value, based on a result of comparison of the noise judgment value ϵ with an absolute value of a result of subtraction of the pixel value (Q11) of the target pixel from the median value. Then, the pixel value determining circuit 18 can change the correction value to be selected, based on a result of comparison of the noise judgment value ϵ with the absolute value.

Further, according to the image processing method for use in the image processing apparatus 10C of this embodiment, the median value or the pixel value (Q11) of the target pixel is selected as the correction value based on a result of comparison of the noise judgment value ϵ with an absolute value of a result of subtraction of the pixel value (Q11) of the target pixel from the median value. Then, the correction value to be selected can be changed based on a result of comparison of the noise judgment value ϵ with the absolute value.

Under a condition that it is determined that an absolute value of a result of subtraction of the pixel value (Q11) of the target pixel from the median value is below the noise judgment value ϵ, the image processing apparatus 10C of this embodiment selects the median value as the correction value. Consequently, the median value selected by the pixel value determining circuit 18 is not a pixel value of the target pixel in which excessive noise is mixed, thereby making it possible to block mixing of noise into the correction value.

In the image processing apparatus 10C of this embodiment, under a condition that it is determined that an absolute value of a result of subtraction of the pixel value (Q11) of the target pixel from the median value is larger than the noise judgment value ϵ, the pixel value (Q11) of the target pixel is selected as the correction value by the pixel value determining circuit 18. Consequently, the pixel value determining circuit 18 can block mixing of noise into the correction value without selecting the median value in which excessive noise is mixed as the correction value.

Further, according to the image processing method for use in the image processing apparatus 10C of this embodiment, under a condition that it is determined that an absolute value of a result of subtraction of the pixel value (Q11) of the target pixel from the median value is below the noise judgment value ϵ, the median value is selected as the correction value. Then, the selected median value is not a pixel value of the target pixel in which excessive noise is mixed, thereby making it possible to block mixing of noise into the correction value.

According to the image processing method of this embodiment, under a condition that it is determined that an absolute value of a result of subtraction of the pixel value (Q11) of the target pixel from the median value is larger than the noise judgment value ϵ, the pixel value (Q11) of the target pixel is selected as the correction value. Consequently, any median value in which excessive noise is mixed is never selected as the correction value thereby blocking mixing of noise into the correction value.

Fourth Embodiment

Figure 8:
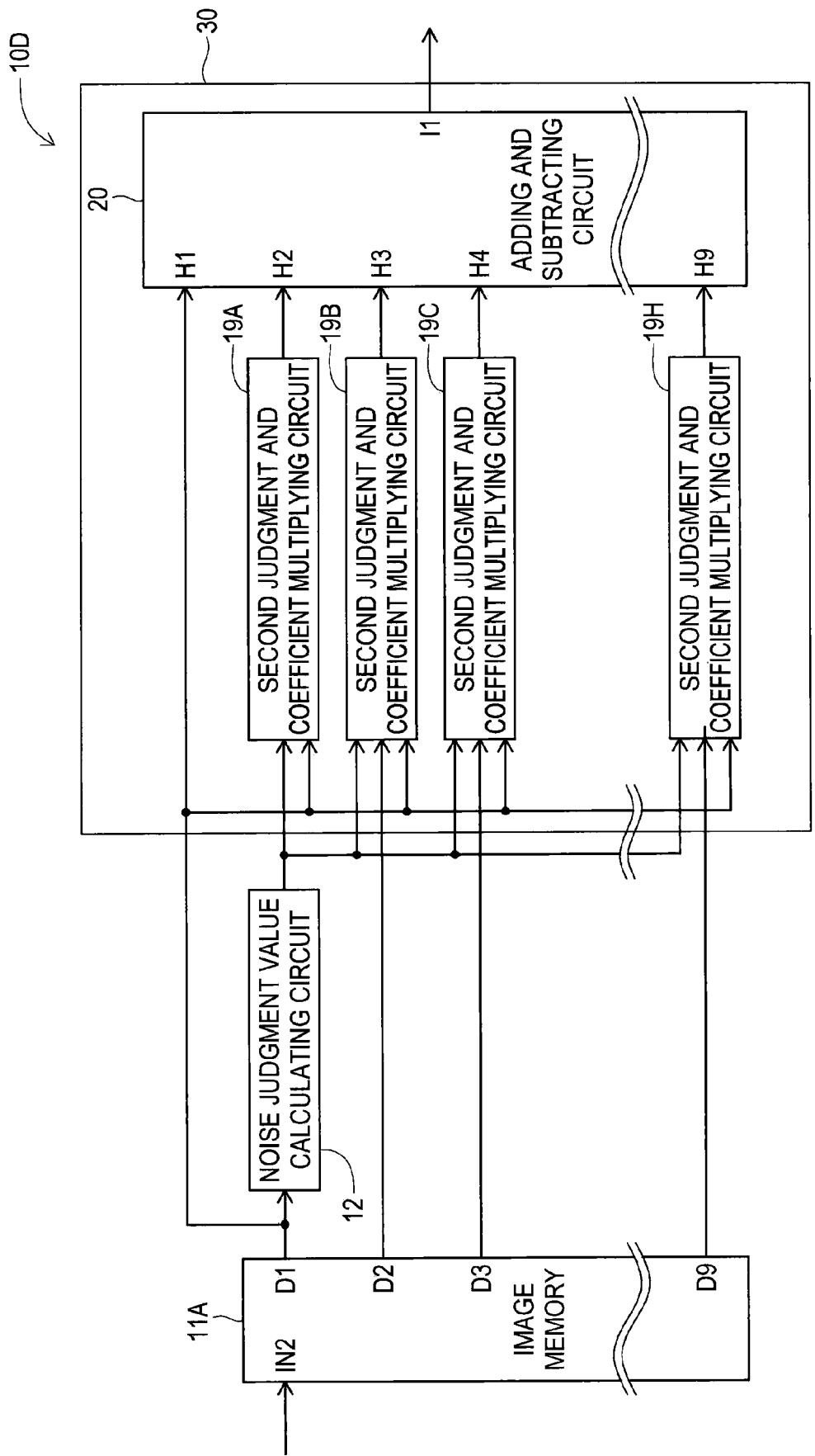
FIG. 8 is a schematic diagram of an image processing apparatus directed to a fourth embodiment.

A fourth embodiment will be described with reference to FIG. 8. FIG. 8 is a block diagram showing the configuration of an image processing apparatus 10D of the fourth embodiment. Like reference numerals are attached to the same composition as the first embodiment to the third embodiment and description thereof is omitted. As shown in the same Figure, the image processing apparatus 10D comprises the image memory 11A, the noise judgment value calculating circuit 12, second judgment and coefficient multiplying circuits 19A-19H and an adding and subtracting circuit 20.

An output of a signal converting portion for processing a signal of an image sensor is connected to the image memory 11A like the second embodiment and the third embodiment. An input terminal of the noise judgment value calculating circuit 12 is connected to the target pixel value output terminal D1 of the image memory 11A.

A first input terminal of the second judgment and coefficient multiplying circuit 19A is connected to an output terminal of the noise judgment value calculating circuit 12. A second input terminal of the second judgment and coefficient multiplying circuit 19A is connected to the target pixel value output terminal D1 of the image memory 11A.

A first input terminal of the second judgment and coefficient multiplying circuit 19B is connected to an output terminal of the noise judgment value calculating circuit 12. A second input terminal of the second judgment and coefficient multiplying circuit 19B is connected to the surrounding pixel value output terminal D2 of the image memory 11A. A third input terminal of the second judgment and coefficient multiplying circuit 19B is connected to the target pixel value output terminal D1 of the image memory 11A.

Each first input terminal of the second judgment and coefficient multiplying circuits 19C-19H is connected to an output terminal of the noise judgment value calculating circuit 12 like the first input terminal of the second judgment and coefficient multiplying circuit 19B. Each second input terminal of the second judgment and coefficient multiplying circuits 19C-19H is connected to each of the surrounding pixel value output terminals D3-D9 of the image memory 11A. Each third input terminal of the second judgment and coefficient multiplying circuits 19C-19H is connected to the target pixel value output terminal D of the image memory 11A.

An input terminal H1 of the adding and subtracting circuit 20 is connected to the target pixel value output terminal D1 of the image memory 11A. Input terminals H2-H9 of the adding and subtracting circuit 20 are connected to an output terminal of the second judgment and coefficient multiplying circuits 19A-19H. In the meantime, reference numeral I1 denotes an output terminal of the adding and subtracting circuit 20.

Next, the image processing method of the image processing apparatus 10D of the fourth embodiment will be described. The image processing apparatus 10D of this embodiment extracts the 3×3 region from data of digital image memorized in the image memory 11A like the second embodiment and the third embodiment.

Further, in the image processing apparatus 10D, the image memory 11A outputs the target pixel value data Q11 from the target pixel value output terminal D1 to the noise judgment value calculating circuit 12, the respective second judgment and coefficient multiplying circuits 19A-19H and the input terminal H1 of the adding and subtracting circuit 20. Additionally, the image memory 11A outputs the surrounding pixel value data Q00 and the like from the surrounding pixel value output terminals D2-D9 to the second input terminal of the second judgment and coefficient multiplying circuits 19B-19H.

The noise judgment value calculating circuit 12 outputs data of the noise judgment value $\epsilon$ to the first input terminal of the respective second judgment and coefficient multiplying circuits 19A-19H. The target pixel value data Q11 and data of the noise judgment value $\epsilon$ are inputted to the second judgment and coefficient multiplying circuit 19A. Further, the target pixel value data Q11, surrounding pixel value data Q00 and the like and data of the noise judgment value $\epsilon$ are inputted to the respective second judgment and coefficient multiplying circuits 19B-19H.

First, the second judgment and coefficient multiplying circuit 19A subtracts the pixel value (Q11) of the target pixel from the pixel value (Q11) of the target pixel. Next, the second judgment and coefficient multiplying circuit 19A compares an absolute value of a subtraction result with the noise judgment value $\epsilon$. The second judgment and coefficient multiplying circuit 19A judges that the absolute value is below the noise judgment value $\epsilon$ and selects a value of the subtraction result.

Subsequently, the second judgment and coefficient multiplying circuit 19A multiplies a value of the subtraction result by a smoothing coefficient. After that, the second judgment and coefficient multiplying circuit 19A outputs a value of the multiplication result to the input terminal H2 of the adding and subtracting circuit 20.

First, the second judgment and coefficient multiplying circuit 19B subtracts the pixel value (Q11) of the target pixel from the pixel value (Q00) of the surrounding pixels. Next, the second judgment and coefficient multiplying circuit 19B compares an absolute value of the subtraction result with the noise judgment value $\epsilon$. The second judgment and coefficient multiplying circuit 19B selects the value of the subtraction result when it judges that the absolute value is below the noise judgment value $\epsilon$.

Subsequently, the second judgment and coefficient multiplying circuit 19B multiplies a value of the subtraction result by the smoothing coefficient. After that, the second judgment and coefficient multiplying circuit 19B outputs a value of the multiplication result to the input terminal H3 of the adding and subtracting circuit 20.

On the other hand, the second judgment and coefficient multiplying circuit 19B selects a preliminarily set value when it judges that the absolute value is larger than the noise judgment value $\epsilon$. In this embodiment, the second judgment and coefficient multiplying circuit 19B selects the pixel value (Q11) of the target pixel when it judges that the absolute value is larger than the noise judgment value $\epsilon$. Subsequently, the second judgment and coefficient multiplying circuit 19B multiplies the pixel value (Q11) of the target pixel by the smoothing coefficient. After that, the second judgment and coefficient multiplying circuit 19B outputs a value of the multiplication result to the input terminal H3 of the adding and subtracting circuit 20.

The respective second judgment and coefficient multiplying circuits 19C-19H subtract the pixel value (Q11) of the target pixel from the pixel values (Q01-Q22 except Q00 and Q11) of the surrounding pixels like the second judgment and coefficient multiplying circuit 19B. Next, the second judgment and coefficient multiplying circuits 19C-19H compare the absolute value of the subtraction result with the noise judgment value $\epsilon$. The respective second judgment and coefficient multiplying circuits 19C-19H select each value of the subtraction result when it judges that the absolute value is below the noise judgment value $\epsilon$.

Subsequently, the respective second judgment and coefficient multiplying circuits 19C-19H multiply the value of the subtraction result by the smoothing coefficient. After that, the second judgment and coefficient multiplying circuits 19C-19H output the value of the multiplication result to the respective input terminals H4-H9 of the adding and subtracting circuit 20.

On the other hand, the second judgment and coefficient multiplying circuits 19C-19H select the pixel value (Q11) of the target pixel when it is judged that the absolute value of the subtraction result is larger than the noise judgment value $\epsilon$ like the second judgment and coefficient multiplying circuit 19B. Subsequently, the respective second judgment and coefficient multiplying circuits 19C-19H multiply the pixel value (Q11) of the target pixel by the smoothing coefficient. After that, the respective second judgment and coefficient multiplying circuits 19C-19H output a value of the multiplication result to the input terminals H4-H9 of the adding and subtracting circuit 20.

First, the adding and subtracting circuit 20 adds all multiplication results inputted to the input terminals H2-H9. After that, the adding and subtracting circuit 20 adds or subtracts a value of the multiplication result to/from the pixel value (Q11) of the target pixel inputted to the input terminal H1. Here, because the subtraction result has a positive value, if the multiplication result has a positive value, the adding and subtracting circuit 20 adds a value of the multiplication result to the pixel value (Q11) of the target pixel. To the contrary, because the subtraction result has a negative value, if the multiplication result has a negative value, the adding and subtracting circuit 20 subtracts a value of the multiplication result from the pixel value (Q11) of the target pixel.

The value produced by adding or subtracting the multiplication result to/from the pixel value (Q11) of the target pixel is a pixel value (Q11') of the target pixel for reducing noise mixed in the digital image. The adding and subtracting circuit 20 outputs the target pixel value data Q11' from the output terminal I1.

The adding and subtracting circuit 20 extracts each 3×3 region from the entire area of the digital image and calculates the aforementioned pixel value (Q11') of the target pixel. The adding and subtracting circuit 20 outputs the calculated target pixel value data Q11' from the output terminal I1. The image processing apparatus 10D of this embodiment restores the digital image using the pixel value (Q11') of the target pixel so as to improve the S/N ratio. In the meantime, the respective second judgment and coefficient multiplying circuits 19A-19H and the adding and subtracting circuit 20 constitute a $\epsilon$ filter 30.

In this embodiment, the respective second judgment and coefficient multiplying circuits 19B-19H compare the noise judgment value $\epsilon$ with an absolute value of a result of subtraction of the pixel value (Q11) of the target pixel from the pixel values (Q01-Q22 except Q11) of the surrounding pixels. Thus, the noise judgment value $\epsilon$ for comparing the absolute value corresponds to a reference value of this embodiment. The noise judgment value calculating circuit 12 corresponds to the selecting section of this embodiment like the first embodiment to the third embodiment.

In this embodiment, comparing the noise judgment value $\epsilon$ with an absolute value of a result of subtraction of the pixel value (Q11) of the target pixel from the pixel values (Q01-Q22 except Q11) of the surrounding pixels corresponds to comparing step of this embodiment. Further, reading and selecting a pixel width (noise judgment value $\epsilon$) allowed to the pixel value (Q11) of the target pixel using the lookup table like the first embodiment to the third embodiment corresponds to the selecting step of this embodiment.

<Effect of the Fourth Embodiment>

In the image processing apparatus 10D of the fourth embodiment described above, the noise judgment value calculating circuit 12 reads and selects a noise judgment value $\epsilon$ corresponding to the pixel value (Q11) of the target pixel. Then, the image processing apparatus 10 of the fourth embodiment can change the noise judgment value $\epsilon$ to be selected, corresponding to the pixel value (Q11) of the target pixel.

In the image processing apparatus 10D of this embodiment, the E filter 30 adopts the noise judgment value $\epsilon$ selected by the noise judgment value calculating circuit 12 as a reference value which compares with an absolute value of result of subtraction of the pixel value (Q11) of the target pixel from the pixel values (Q00-Q22 except Q11) of the surrounding pixels. In the image processing apparatus 10D of this embodiment, the reference value changes with the noise judgment value $\epsilon$ selected corresponding to the pixel value (Q11) of the target pixel, so that the reference value of the E filter 30 can be changed corresponding to the pixel value (Q11) of the target pixel.

According to the image processing method for use in the image processing apparatus 10D of the fourth embodiment, the noise judgment value $\epsilon$ is read out and selected corresponding to the pixel value (Q11) of the target pixel. The image processing method of the fourth embodiment enables the selected noise judgment value $\epsilon$ to be changed corresponding to the pixel value (Q11) of the target pixel.

Further, according to the image processing method for use in the image processing apparatus 10D of this embodiment, the selected noise judgment value $\epsilon$ is compared with an absolute value of a result of subtraction of the pixel value (Q11) of the target pixel from the pixel values (Q00-Q22 except Q11) of the surrounding pixels. Then, according to the image processing method of this embodiment, the noise judgment value $\epsilon$ to be compared with the absolute value can be changed corresponding to the pixel value (Q11) of the target pixel, so that an optimum noise judgment value $\epsilon$ can be selected corresponding to changes in the pixel value (Q11) of the target pixel.

This embodiment is not restricted to the above-described embodiments but may be carried out by changing part of its configuration appropriately within a range not departing from the spirit of the embodiment. For example, instead of the lookup table, an approximate expression indicating a correspondence relationship between the pixel value of the target pixel value and the noise judgment value $\epsilon$ as illustrated with solid line in FIG. 9, may be memorized in the noise judgment value calculating circuit 12, different from the above-described embodiments. Consequently, by using the expression indicating faithfully the correspondence relationship between the pixel value of the target pixel and the noise judgment value $\epsilon$ as shown with dotted line in FIG. 9, load required for the noise judgment value calculating circuit 12 to calculate the noise judgment value $\epsilon$ can be reduced as compared with a case where the noise judgment value calculating circuit 12 calculates the noise judgment value $\epsilon$ corresponding to the pixel value of the target pixel. Then, accompanied by a reduction of the load required for calculation of the noise judgment value $\epsilon$, the circuit configuration of the noise judgment value calculating circuit 12 can be simplified.

Figure 9:
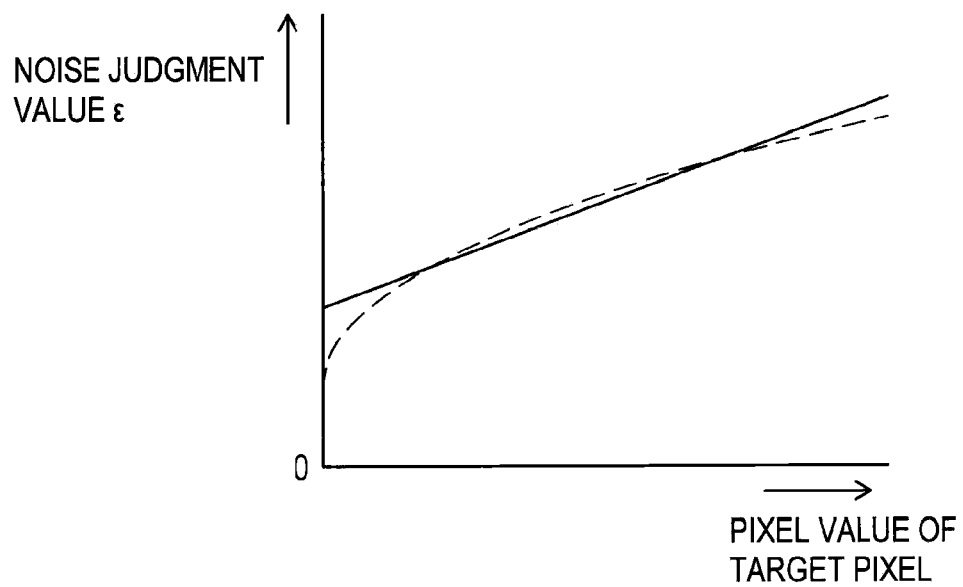
FIG. 9 is a graph showing change of an approximate value of a noise judgment value with reference to a pixel value of a target pixel.

Further, the noise judgment value $\epsilon$ may be calculated using the approximation expression indicating the correspondence relationship between the pixel value of the target pixel and the noise judgment value $\epsilon$ as shown with solid line in FIG. 9, instead of the lookup table, different from the image processing method of the above-described embodiment. Consequently, by using the expression indicating faithfully the correspondence relationship between the pixel value of the target pixel and the noise judgment value $\epsilon$ as shown with dotted line in FIG. 9, load required for calculating the noise judgment value $\epsilon$ can be reduced as compared with a case of calculating the noise judgment value $\epsilon$ corresponding to the pixel value of the target pixel.

Weighting of each filter coefficient of the filter table may be changed different from the above-described first embodiment. Although the image processing apparatuses 10A-11D of the above embodiments extract a 5×5 region or a 3×3 region from data of digital image, the extraction region may be changed appropriately. Further, instead of the standard deviation $\sigma$ of the noise, the noise judgment value $\epsilon$ may be set using other deviation such as average deviation, different from the first embodiment described above.

According to the image processing apparatus and the image processing method of this embodiment, the pixel width to be selected can be changed corresponding to the real value of the target pixel by selecting a pixel width allowed to the real value as the pixel value of the target pixel corresponding to the real value of the target pixel.

According to this embodiment, any one or both of the pixel value of the surrounding pixel and the pixel value of the target pixel are extracted as a correction value for correcting the pixel value of the target pixel corresponding to a selected pixel width-Then, the correction value to be extracted may be changed corresponding to the pixel width. Therefore, according to this embodiment, noise in the pixel value of the target pixel can be reduced by correcting the pixel value of the target pixel with the extracted correction value.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image processing apparatus reducing a noise included in a target pixel based upon pixel values of surrounding pixels of the target pixel, the image processing apparatus comprising:
    a selecting circuit configured to select a noise judgment value tolerable with reference to a pixel value of the target pixel; and
    a correcting section extracting circuit configured to extract either pixel values of the surrounding pixels or the pixel value of the target pixel, as a correction value for correcting the pixel value of the target pixel depending on the noise judgment value selected by the selecting circuit,
    wherein the selecting circuit determines the noise judgment value based on an average deviation on distribution of the pixel value of the target pixel, and
    the selecting circuit calculates the noise judgment value by an approximate expression that expresses a relation of the pixel value of the target pixel and the noise judgment value.

2. The image processing apparatus according to claim 1, wherein the selecting circuit has a look-up table that stores a relation of the pixel value of the target pixel and the noise judgment value.

3. The image processing apparatus according to claim 1, wherein the correcting circuit extracts either, the pixel values of the surrounding pixels or the pixel value of the target pixel as the correction value based on a comparison result in which the noise judgment value is compared with a differential value between the pixel values of the surrounding pixels and the pixel value of the target pixel.

4. The image processing apparatus according to claim 3, wherein the correcting circuit extracts the pixel values of the surrounding pixels as the correction value based on the comparison result when detecting that the differential value is the noise judgment value or lower, and the correcting circuit extracts the pixel value of the target pixel as the correction value based on the comparison result when detecting that the differential value is the noise judgment value or larger.

5. The image processing apparatus according to claim 4 further comprising a smoothing filter that calculates the pixel value of the target pixel by weighted-averaging all pixel values including either, the pixel values of the surrounding pixels or the pixel value of the target pixel extracted by the correcting circuit.

6. The image processing apparatus according to claim 4 further comprising a median filter that selects a median value from all pixel values including either, the pixel values of the surrounding pixels or the pixel value of the target pixel extracted by the correcting circuit, and uses the median value as the pixel value of the target pixel.

7. The image processing apparatus according to claim 1, wherein the correcting circuit extracts either a median value or the pixel value of the target pixel as the correction value based on a comparison result in which the noise judgment value is compared with a differential value between a median value of all of pixel values including the pixel values of the surrounding pixels and the pixel value of the target pixel and the pixel value of the target pixel.

8. The image processing apparatus according to claim 7, wherein the correcting circuit extracts the median value as the correction value based on the comparison result when detecting that the differential value is the noise judgment value or lower, and the correcting circuit extracts the pixel value of the target pixel as the correction value based on the comparison result when detecting that the differential value is the noise judgment value or larger.

9. An image processing apparatus reducing a noise included in a target pixel based upon pixel values of surrounding pixels of the target pixel, the image processing apparatus comprising:
   a selecting circuit configured to select a noise judgment value tolerable with reference to a pixel value of the target pixel; and
   an $\epsilon$ filter that configured to use the noise judgment value selected by the selecting circuit as a reference value to be compared with a differential value between the pixel values of the surrounding pixels and the pixel value of the target pixel,
   wherein the selecting circuit determines the noise judgment value based on an average deviation on distribution of the pixel value of the target pixel, and
   the selecting circuit calculates the noise judgment value by an approximate expression that expresses a relation of the pixel value of the target pixel and the noise judgment value.

10. The image processing apparatus according to claim 9, wherein the selecting circuit has a look-up table that stores a relation of the pixel value of the target pixel and the noise judgment value.

11. An image processing method for an image processing apparatus that reduces a noise included in a target pixel based upon pixel values of surrounding pixels of the target pixel, the image processing method comprising:
   selecting a noise judgment value tolerable with reference to a pixel value of the target pixel; and
   extracting either pixel values of the surrounding pixels or the pixel value of the target pixel, as a correction value for correcting the pixel value of the target pixel depending on the noise judgment value selected by the selecting,
   wherein the selecting determines the noise judgment value based on an average deviation on distribution of the pixel value of the target pixel, and
   the selecting calculates the noise judgment value by an approximate expression that expresses a relation of the pixel value of the target pixel and the noise judgment value.

12. The image processing method according to claim 11, wherein the selecting selects the noise judgment value in accordance with a look-up table that stores a relation of the pixel value of the target pixel and the noise judgment value.

13. The image processing method according to claim 11, wherein the extracting is based on comparing the noise judgment value with a differential value between the pixel values of the surrounding pixels and the pixel value of the target pixel.

14. The image processing method according to claim 13 wherein the extracting extracts the pixel values of the surrounding pixels as the correction value upon detecting that the differential value is the noise judgment value or lower, and the extracting extracts the pixel value of the target pixel as the correction value upon detecting that the differential value is the noise judgment value or larger.

* * * * *